United States Patent [19]
Lowrance

[11] 3,800,217
[45] Mar. 26, 1974

[54] PIPELINE INCLUDING MEANS OF INDICATING THE EXISTENCE OF AND LOCATION OF A LEAK

[75] Inventor: Darrell J. Lowrance, Tulsa, Okla.

[73] Assignee: Lowrance Electronics Mfg. Corp., Tulsa, Okla.

[22] Filed: Sept. 23, 1971

[21] Appl. No.: 183,206

[52] U.S. Cl.................. 324/54, 73/40.5 R, 324/52, 340/242
[51] Int. Cl....................... G01m 3/16, G01r 31/12
[58] Field of Search.......... 324/52, 67, 54; 340/242; 174/11; 73/40.5

[56] References Cited
UNITED STATES PATENTS

| | | | |
|---|---|---|---|
| 3,564,526 | 2/1971 | Butts.................................. | 340/242 |
| 3,383,863 | 5/1968 | Berry............................. | 340/242 X |
| 2,759,175 | 8/1956 | Spalding........................... | 340/242 |
| 3,098,116 | 7/1963 | Jore et al....................... | 324/52 UX |
| 3,382,493 | 5/1968 | Loper et al.................... | 340/242 X |
| 3,600,674 | 8/1971 | Roberts........................... | 340/242 X |
| 3,187,080 | 6/1965 | Ball................................... | 174/11 R |
| 3,347,098 | 10/1967 | Bielstein et al.............. | 174/11 R X |
| 3,210,655 | 10/1965 | McGlasson et al................. | 324/54 |
| 3,252,155 | 5/1966 | Surtees et al....................... | 340/242 |

Primary Examiner—Gerard R. Strecker
Attorney, Agent, or Firm—Head & Johnson

[57] ABSTRACT

A pipeline including means of indicating the existance of and location of a leak, including a buried liquid carrying pipeline of nonconductive material, a bare conductor buried adjacent the pipeline, a conductive element in the pipeline providing conductivity with the fluid in the pipeline, voltage means providing electrical potential between the conductive elements and the conductor, and current measuring means in series of the voltage means, the conductive element and the conductor whereby a closed circuit is provided when a leak occurs in the line, the current detected by the current measuring means providing an indication of the distance from the conductive element to the leak.

4 Claims, 5 Drawing Figures

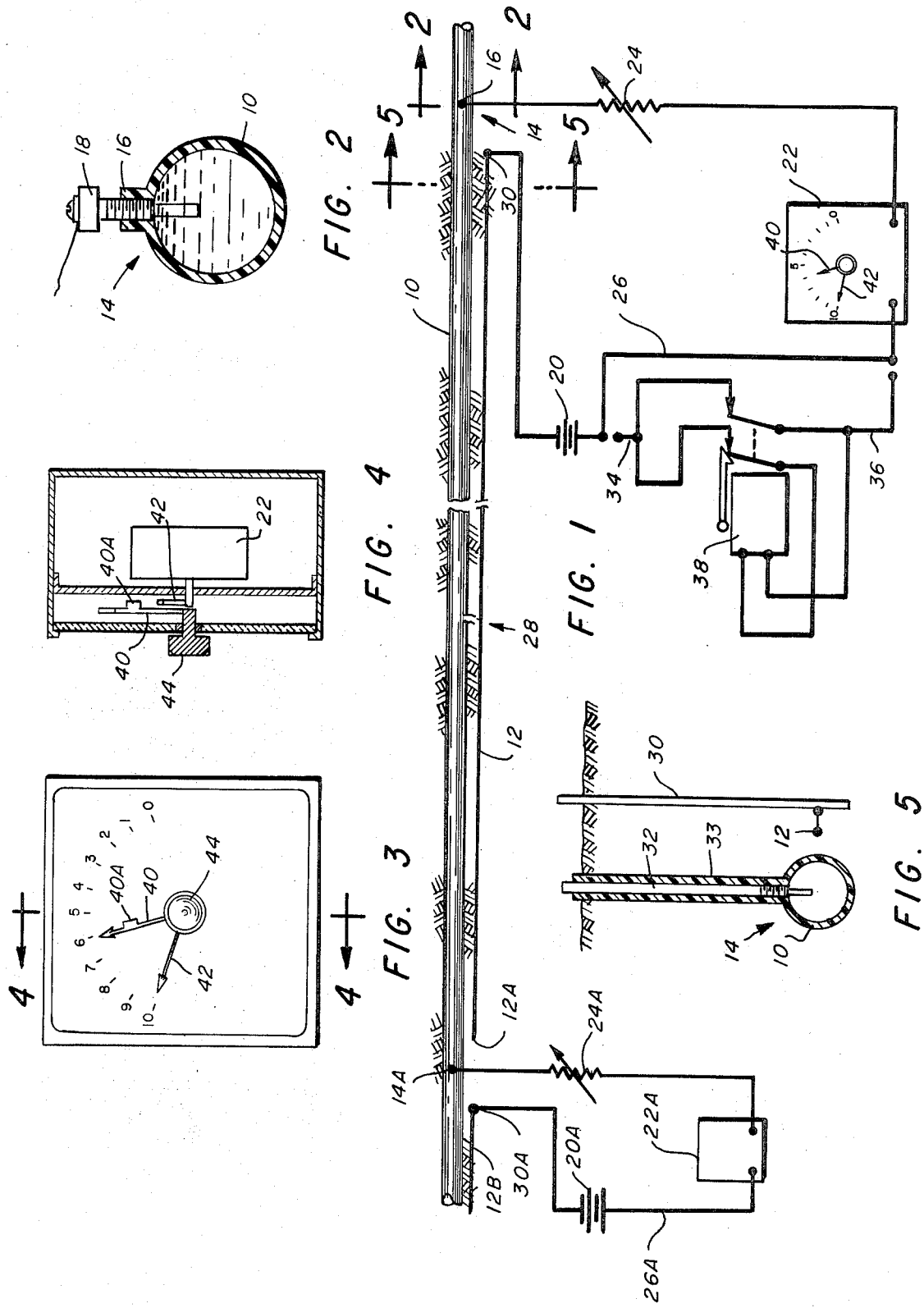

PIPELINE INCLUDING MEANS OF INDICATING THE EXISTENCE OF AND LOCATION OF A LEAK

BACKGROUND, SUMMARY AND OBJECTS OF THE INVENTION

In recent years the use of plastic pipe for carrying liquids has become a common practice. In many parts of the nation at the present time rural water districts have been established providing potable water for use by rural residents in areas where a water distribution system has not previously been available. In addition, plastic pipe is being more frequently used for the transmission of petroleum products and other liquids.

This invention is directed towards a means of readily indicating the existence of and location of a leak if it occurs in a plastic pipe. The expression "plastic pipe" is meant to include any pipeline of nonconductive material, plastic being a good example.

It is therefore an object of this invention to provide a pipeline of nonconductive material including means of indicating the existence of and location of a leak therein.

More particularly, an object of this invention is to provide a pipeline of nonconductive material for transporting liquids, including a bare conductor buried adjacent to the pipeline and electrical continuity means between the conductor and the liquid contacts of the pipeline for indicating the presence of and location of a leak.

Still more particularly, an object of this invention is to provide a pipeline system including a pipeline of nonconductive material, for transporting liquids, a bare conductor buried adjacent the pipeline, conductivity means providing electrical contact with the liquid carried in the pipeline, a source of voltage potential, and a current measuring means, all in series, the current measuring means being calibrated to indicate the distance from the conductive element to the point of a leak when the leak causes a closed circuit between the liquid in the pipeline and the adjacent bare conductor.

Still more particularly, an object of this invention is to provide a pipeline means for indicating the existence of and location of a leak therein, including a buried liquid carrying pipeline of nonconductive material, a bare conductor adjacent the pipeline, a conductive element in the pipeline providing electrical contact with the liquid in the pipeline, a voltage source, and a current measuring means all in series including a time delay means for disconnecting the voltage source at a preselected time after completion of the circuit occasioned by a leak, including means of indicating the reading of the current measuring means at the time the circuit is disconnected.

These objects as well as others will be fulfilled by the apparatus to be described in the following description and claims, taken in conjunction with the attached drawings.

DESCRIPTION OF THE VIEWS

FIG. 1 shows a nonconductive pipeline buried in the ground with an adjacent bare conductor buried with it and including a schematic diagram of a circuit arrangement, the circuit being utilized to indicate the presence and location of a leak in the pipeline.

FIG. 2 is a cross-sectional view taken along the line 2—2 of FIG. 1 showing one method of providing a conductive element for use in the invention.

FIG. 3 is a front view of a current indicating meter of a type which may be utilized to provide an indication of the location of a leak in the pipeline.

FIG. 4 is a cross-sectional view of the meter of FIG. 3 taken along the line 4—4 of FIG. 3.

FIG. 5 is a cross-sectional view of the pipeline taken along the line 5—5 of FIG. 1 showing the relative position of the pipeline and the adjacent conductor.

DETAILED DESCRIPTION

Referring to the drawings and first to FIG. 1, numeral 10 indicates a buried liquid carrying pipeline including the provision of this invention for indicating the presence and location of a leak therein. Pipeline 10 must be, in order to practice this invention, of nonconductive material, such as one of the many types of plastics of which pipelines are presently formed. The pipeline 10 is utilized to carry liquid of a type having some degree of conductivity. As an example, pipeline 10 may be utilized to transport water. While pure or distilled water is a poor conductor, all water in normal usage includes some impurities and therefore has conductivity. Pipeline 10 may be utilized to transport any other type of liquid which has some degree of conductivity, such as any type of liquid petroleum product.

Buried adjacent to the pipeline 10 is a bare conductor 12. Conductor 12 may be of copper, steel, aluminum or the like. The specific type of conductor 12 utilized depends primarily upon economics but is also determined by soil condition in which the pipeline is positioned. Shown in cross-sectional view of FIG. 5, the conductor 12 may be positioned to one side of pipeline 10, or it may equally as well be placed at the top or bottom of the line. The conductor 12 may be spaced slightly away from the pipeline 10 or directly contiguous to it.

To provide continuity with the fluid inside the pipeline 12, a conductive element is utilized, one example of which is shown in FIG. 2, the conductive element being indicated generally by the numeral 14. In this arrangement a threaded coupling 16 is formed in the pipeline into which a bolt 18 is threaded, the bolt extending downwardly into the interior of the pipe to contact the fluid in it. The conductive element 14 of FIG. 2 is merely exemplary. Other types of conductive elements include a metallic coupling between joints of plastic pipe, ax valve of conductive material placed in the pipeline, a T-fitting of conductive material placed in the pipeline, or any other means of providing conductivity from the exterior of the pipeline to the liquid content within it.

In its basic simplicity the invention, in addition to the pipeline 12 of nonconductive material, conductor 12, and conductive element 14, includes a source of electrical energy, such as a battery 20, a current measuring means, such as ammeter 22, and a calibrating means, such as variable resistor 24. One side of battery 20 is connected to conductor 12 and the other side, by means of conductor 26, to the ammeter 22. As long as no leak occurs in pipeline 10 there is an open circuit and no current will flow through ammeter 22. If a leak occurs, such as at 28, fluid flows through the leak and encounters conductor 12. Thus a completed circuit is established and current may now flow from battery 20, through conductor 26, through ammeter 22, through variable resistor 24, through conductive element 14, through the fluid in pipeline 10 from the conductive element to leak 18, and through the leak to conductor 12 and back to battery 20.

Ammeter 22 is calibrated in such a way that a leak occurring near the conductive element 14 will provide a full scale reading. The meter may be calibrated such as from 0 to 10. Since a leak occurring near conductive element 14 will have the shortest path of travel minimum resistance in the closed circuit is encountered and the instrument 22 can be adjusted to a full scale reading by variable resistance 24. As the leak 28 occurs further away from conductive element 14, the length of the path of current flow increases with correspondingly greater increase in resistance, and a proportionately smaller current reading in ammeter 22 occurs. The value of the factors making up the circuit may be arranged such that at the end 12A of conductor 12 the reading on the ammeter 22 will be very small, or effectively zero. Thus the instrument may be calibrated in inverse numerical order from 10 to 0 indicating in tenths the percentage of the total length of the conductor 12 from the point of conductive element 14 to the point of leak 28. Thus if leak 28 is halfway between conductive element 14 and the end 12A of the conductor ammeter 22 would be calibrated to point to numeral 5. Regardless of the distance from conductive element 14 to the end 12A conductor 12 meter 22 indicates the position of leak 28 in terms of the percentage of such total length. If the distance between conductive element 14 and the end of conductor 12A is, for example, one mile, then a reading of "5" on instrument 22 would indicate that the leak is one-half mile from the conductive element 14.

In many instances it will be necessary to provide a series of conductors 12 and meters 22 along a pipeline 10 particularly if the pipeline is of long length. A second conductive element 14A is shown in pipe 10 connected to a calibrating resistor 24A and meter 22A. Conductive element 14A is positioned in pipeline 10 adjacent the end 12A of conductor 12. A second conductor 12B is connected to instrument 22A in series with a voltage source 20A. The spacing between conductive elements 14 and 14A, that is, the length of conductor 12, depends to a great extent upon the desired accuracy of the system. Obviously, the longer the length of conductor 12 the less accurately meter 22 will indicate the precise location of a leak 28.

In FIG. 5 a post 30 is provided extending to the surface of the earth. An insulated post 32 extends from the conductive element 14 to the earth's surface. The electrical items, including meter 22, battery 20, and calibrating resistor 24, may be permanently affixed to the posts 30 and 32 at the earth's surface or they may be in the form of a portable instrument which may be carried to a test site and temporarily attached to the posts 30 and 32 at the ends thereof extending above the earth's surface to provide the measurement to indicate the existance of and location of a leak. If desired, the upper ends of posts 30 and 32 may be encompassed in a housing for physical protection and the housing may be covered with a lid which may be opened for measurement purposes.

FIGS. 1, 3 and 4 show an alternate arrangement of the invention. In some instances when a leak 28 occurs the fluid carried by the pipeline will seep in the earth along the pipeline a substantial distance. The resistance reflected by the flow path to current will normally be less if leakage has occurred for an extended period of time. Thus, if a leak has occurred for a substantial length of time an erroneous indication may be given of the exact location of the leak. To prevent such erroneous reading as a consequence of leakage over an extended period, an arrangement is provided wherein the indication of the leak is made soon after the leak initially occurs with provision for preventing a distortion of the meter reading due to the spread of the leakage along the pipeline. In utilizing the alternate arrangement conductor 26 is eliminated and instead the conductors 34 and 36 are connected between battery 20 and meter 22. Conductors 34 and 36 extend to a double pole time delay latching relay 38. When leak 28 occurs current flows through the relay 28 providing an indication on meter 22. After a preselected time delay, such as one minute, five minutes, thirty minutes or the like, relay 38 actuates, opening the circuit. The actuation of the relay 38 latches it in the open position. When relay 38 opens current flow through meter 32 terminates. To preserve the reading at the time, at which relay 38 actuates an indicator hand 40 is provided on meter 22. Hand 40 includes a portion 40A which is engaged by meter pointer 42 as the meter reading advances to move the indicator hand 40 to the maximum reading of pointer 42. When current flow through meter 22 is terminated as relay 38 opens pointer 42 drops back to the zero current position but indicator hand 40 remains in the maximum advanced position. By means of positioning knob 44 the indicator hand 40 may be turned back to zero after a leak is repaired so that the meter will be in condition to again indicate when a leak has occurred.

The measurement of the resistance of the closed path which occurs when a leak 28 results is the measurement of the resistance of the column of liquid in the pipeline 10 from the conductivity element 14 to leak 28, plus the measurement of resistance of the soil from the leak 28 to conductor 12 (which will normally be very nominal since conductor 12 is placed immediately adjacent the pipeline 10), plus the resistance of the conductor 12 from the leak 28 to the measuring station or post 30. If a conductor 28 is selected having a relatively small resistance compared to the resistance of the liquid column in pipeline 10, the resistance measurement will be, in effect, only that of the liquid column. Thus, the spread of liquid as a leak occurs will not substantially change the reading of meter 22. In this case the use of the means for indicating the meter reading after a preselected time, such as illustrated in FIGS. 1, 3 and 4, will not be necessary.

While the invention has been described with a certain degree of particularity, it is manifest that many changes may be made in the details of construction and the arrangement of components without departing from the spirit and scope of this disclosure. It is understood that this invention is not limited to the specific embodiment set forth herein for purposes of exemplification, but is to be limited only by the scope of the attached claim or claims, including the full range of equivalency to which each element or step thereof is entitled.

What is claimed:

1. A pipeline including means of indicating the existance of and location of a leak therein comprising:

a buried liquid carrying pipeline of nonconductive material;

a bare conductor buried adjacent to and exteriorly of said pipeline;

a conductive element extending through the pipeline wall from the exterior to the interior thereof providing conductivity with the liquid in said pipeline;

voltage means providing electrical potential between said conductive element and said conductor; and current measuring means in series with said voltage means, said conductor and said conductive element, and including means for indicating the current flow whereby the location of the leak along the pipeline may be determined.

2. A pipeline according to claim 1 wherein said conductive element includes a conductive probe.

3. A pipeline according to claim 1 including a plurality of said conductive elements in spaced relationship, and a said bare conductor associated with each of said conductive elements, each of said conductors terminating adjacent the next adjacent conductive elements, and a said voltage source, and a said current indicating means with each said conductive element, each said conductive element, conductor, voltage source and current measuring means providing leak indicating means for a portion of said pipeline.

4. A piepline according to claim 1 including:

a time delay means with said current indicating means, said time delay means being activated when current flow is detected by said current indicating means; and means of retaining indefinitely the indication of the initial indicated by said current indicating means at the end of the time delay period of said time delay means.

* * * * *